United States Patent

Wolf et al.

[11] Patent Number: 5,328,408
[45] Date of Patent: Jul. 12, 1994

[54] SHAFT ABSORBER

[75] Inventors: Franz J. Wolf, Bad Soden-Salmünster; Manfred Thesenvitz, Schlüchtern; Martin Mohr, Brachttal-Udenhain; Joachim Schneider, Bad Soden-Salmünster, all of Fed. Rep. of Germany

[73] Assignee: WOCO Franz-Josef Wolf & Co., Bad Soden-Salmünster, Fed. Rep. of Germany

[21] Appl. No.: 906,590

[22] Filed: Jun. 30, 1992

[30] Foreign Application Priority Data

Jul. 1, 1991 [DE] Fed. Rep. of Germany ....... 4121746

[51] Int. Cl.5 .............................................. F16F 15/12
[52] U.S. Cl. ..................................... 464/180; 464/83; 74/574
[58] Field of Search ...................... 464/83, 87, 89, 180; 74/574

[56] References Cited

U.S. PATENT DOCUMENTS

| 3,274,798 | 9/1966 | Wiggins, Jr. | 464/180 X |
| 3,408,830 | 11/1968 | Sutaruk et al. | 464/180 X |
| 3,540,233 | 11/1970 | Pearson | 464/83 X |
| 4,734,079 | 3/1988 | Viets | 464/180 X |
| 4,825,718 | 5/1989 | Seifert | 464/180 X |
| 4,825,983 | 5/1989 | Nakanishi | 74/574 X |
| 5,188,002 | 2/1993 | Wolf et al. | 74/574 |

FOREIGN PATENT DOCUMENTS

| 524676 | 12/1953 | Belgium . | |
| 2507253 | 9/1976 | Fed. Rep. of Germany | 464/180 |
| 1346637 | 2/1974 | United Kingdom | 464/83 |

Primary Examiner—Clifford D. Crowder
Assistant Examiner—John J. Calvert
Attorney, Agent, or Firm—Lowe, Price, LeBlanc & Becker

[57] ABSTRACT

Absorbers for rotating shafts, particularly for universal-joint propeller shafts in motor vehicle construction, are formed with a segmented elastomer ring interconnecting an outer inertia ring and an inner hub ring. The inertia ring is connected to the hub ring with two to six connecting links made of elastic material which, in axial cross-section, primarily have the outer contour of a radially aligned and tangentially constricting "X". Surface complementary buffer webs are placed between the connecting links and form a comparatively close equidistant parting gap in relation to the neighboring connecting links and to the opposing surface of the hub ring.

9 Claims, 1 Drawing Sheet

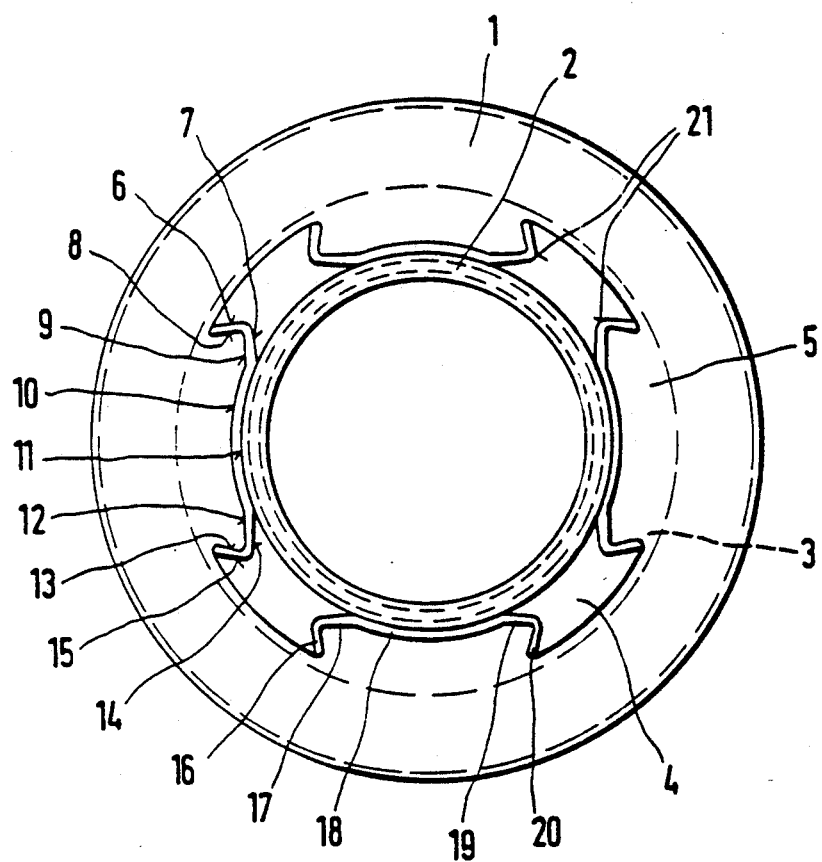

SHAFT ABSORBER

DESCRIPTION

1. Technical Field

The present invention relates an absorber and, in particular, a shaft absorber generally comprised of three rings arranged concentrically in relation to each other, namely an outer inertia ring, an inner hub ring, and an elastomer ring flexibly coupling the inner and outer rings.

2. Background Art

Shaft absorbers of this type are well known and are extensively used in the motor vehicle industry, primarily to absorb acoustic vibrations.

With the exception of a few problem areas, the necessary adaptation and fine adjustment of shaft absorbers to specific application requirements is nowadays no longer an insoluble problem in the age of computer-aided design.

The previously mentioned problem fields, however, still include effective absorption of vibrations arising in the acoustics at the universal-joint propeller shaft of motor vehicles, in particular those having front-wheel drive. Not only are absorbers with adequate damping and absorbing function lacking for this particular application, but their service life is inadequate. The improvement of absorber durability should have high priority for all fields of absorber applications.

In view of such a state of the art in engineering it is an object of the invention to provide a shaft absorber, more particularly an absorber for universal-joint propeller shafts of motor vehicles having front-wheel drive, having not only an improved absorbing effect with regard to frequency width and efficiency, but also having a significantly extended durability under operating conditions, i.e. having an extended service life.

SUMMARY OF THE INVENTION

A shaft absorber, in accordance with the present invention, is comprised of three concentrically arranged rings in the form of an outer inertia ring, an inner hub ring, and a segmented elastomer ring therebetween. The segments of the elastomer ring connect the inertia and hub rings through axially extending connecting links having in their axial projection at least substantially an X-shaped outer contour extending radially between the inner and outer rings and being firmly fixed to the outer surface area of the hub by means of a compound material joint or a positive joint along their radially inner side. These segments are firmly fixed to the inertia ring at their radially outer side also by means of a compound material joint or a positive joint.

With regard to the absorbing characteristics of the shaft absorber, importance must be attributed to the contour of the elastomer links extending axially through the absorber and firmly yet flexibly coupling the hub and inertia rings axially and radially. In axial view, the external contour of the connecting links substantially have the shape of a radially aligned and tangentially constricting "X". Due to such a design of the elastomer ring coupler body, the absorbing inertia mass ring body not only has a rotational oscillation degree of freedom, but also has enhanced radial-translatory, axial-translatory, pitching and tilting vibrational degrees of freedom.

In a shaft absorber having the features of the invention an adjustment of the individual vibrational components can be obtained in a simple manner not only by an adjustment of the characteristics of the elastomeric material, but also by modifying the geometric configuration and the number of the coupling connecting links. The connecting links couple the hub ring to the inertia ring, and normally they are distributed at an equi-angular spacing in relation to each other. Preferentially, three to six of such connecting links are provided, with preference being given to four of such connecting links. The spacing between two neighbouring connecting links, measured in the circumferential direction of the absorber, should be in the range of between identical in size and not more than double the size of the average width of the actual connecting links, likewise measured in the circumferential direction.

According to a modified embodiment of the invention, the service life and the absorbing efficiency of such a shaft absorber can be substantially extended and ameliorated, respectively, by configurative insertion of axially extending buffer webs inbetween two neighbouring connecting links. The buffer webs designed as parts of the elastomer ring radially outwardly thus are firmly fixed to the inertia ring by means of a compound material joint and/or positive joint. This means that the external contour of the buffer webs is complementary to the inner contour of the cut-outs formed between the connecting links; the buffer segments are designed in such a manner that, when the absorber is in the rest position, they leave a continuous free parting gap between two neighbouring connecting links and the free shell of the hub ring located in that particular area.

Normally, it will be sufficient when this parting gap has a constant width over its entire length, i.e. the parting surfaces—formed by the parting gap—maintain the same spacing between the connecting links and buffer webs on the one hand, and over the entire length of the precisely surface complementary separating-joint gap on the opposite shell surface section of the hub ring.

According to another embodiment of the invention, a perceptible extension of the service life is possible, even under continuous dynamic stress, by maintaining a constant distance between the parting surfaces that determine the parting gap in the radial outer area, between the connecting links and the buffer webs, as well as between the buffer webs and the hub ring shell surfaces; while the parting surfaces forming the parting gap in the radial inner area of the parting gap section, created between the connecting links and the buffer webs, are slightly inclined against each other so that the parting gap becomes wider in the radial inward direction, i.e. from the point of maximum constriction of the outer profile of the connecting link radially inwards in the direction of the hub ring surface. The width at which this separating gap section ultimately opens is then, preferably, equal to the subsequent constant width of the parting gap between the section of the hub ring shell and the opposing radial inner parting surface of the buffer web.

The degree of opening, i.e. the degree of inclination of the two parting surfaces between one given connecting link and a buffer web, is comparatively small so that there is only a minor widening of the parting gap in the radial inward direction towards the hub ring. Preferably, the final maximum opening of the parting gap section immediately over the hub ring, should be approximately 1.1 to 2.5 times that of the original width of the parting gap section within the vicinity of the maximum constriction of the outer profile of the connecting link when in a non-deformed state. Such a minor widening of the parting gap section hardly modifies the inertia characteristics of the absorber, however, in nearly all principal oscillation modes of the absorber, including axial tilting oscillations, it means that large and even outsized amplitudes will not cause the parting surfaces—acting as stopping faces in this section of the parting gap between the connecting link and the buffer segment—to strike each other with relatively intense deformation of the elastomer of the two links. Instead, a roll-off or bearing motion will take place, commencing from an initial edge contact between the parting surfaces of the two links, ultimately leading to the area contact between the connecting link and the buffer web that is required with very large amplitudes. In addition to improved acoustic absorption, the smoothing of the temporal course of distribution of the deformation tension in the elastomer ring results in a significantly extended service life of the absorber.

A particularly effective interaction between buffer webs and connecting links is achieved by another modification of the invention when the connecting links are axially shorter than the buffer webs; in this instance the connecting links are axially centered in relation to the buffer webs so that, in other words, the buffer webs at both axial sides of the absorber protrude over the axial ends or side surfaces of the connecting links. The length by which the connecting links should be shorter than the buffer webs is a matter of usual adjustment for the expert to resolve for each individual application. Normally, the connecting links on either side should not retract by more than approximately 10 to 15% of the overall length of the buffer webs.

BRIEF DESCRIPTION OF THE INVENTION

FIG. 1 is a side view of a universal-joint propeller shaft absorber for motor vehicles to absorb acoustic vibrations arising at the universal-joint propeller shaft, or which can be transmitted by the latter.

DETAILED DESCRIPTION OF THE INVENTION

FIG. 1 shows a universal-joint propeller shaft absorber as a side view, in axial direction; it has a diameter of approximately 90 mm and an axial length of approximately 30 mm, and consists of an external inertia ring (1), an inner hub ring (2), and an elastomer ring (3) arranged concentrically between the two previously mentioned rings.

The elastomer ring is segmented and consists of connecting links (4) and buffer webs (5). Wherever possible, and for cost reasons, the connecting links (4) and the buffer webs (5) are preferably made of one and the same elastomer material. However, the connecting links and buffer webs can be made of differing materials, or of chemically identical elastomers in differing settings wherever this is necessary or desirable for cost reasons. In the example explained here, the connecting links (4) and the buffer webs (5), which jointly form the segmented elastomer ring between the hub ring and the inertia ring, consist of one and the same material, and they were produced by the same shaping process.

The four connecting links (4) are spaced at 90° in relation to each other, as shown by FIG. 1 in the axial side view, and have an external contour which approaches the form of a radially aligned and tangentially constricted "X". Alternatively, this link profile could also be described as having a shape like a sand timer.

At their radially inner side each of the four connecting links (4) is firmly connected with the outer surface of the hub ring (2), and they extend radially outwards without any interruption to form an integral part of the elastomer ring (3). On each of their two axial sides, the four connecting links (4) are shorter than the buffer webs (5) by 10%. The elastomer ring (3) is firmly connected with the cylindrical interior wall of the inertia ring (1); thus, the hub ring (2) and the inertia ring (1) are interconnected axially, radially and tangentially in an elastic manner by the elastic connecting links (4) of the segmented elastomer rings (3) while maintaining substantially all vibrational degrees of freedom, thereby functionally providing an inertia absorber substantially consisting of the inertia ring and the connecting links.

A highly effective, multi-model oscillator is obtained as a result of the arrangement, design and contouring of the connecting link profiles.

As a result of the central constriction of the connecting link profiles, it has to be accepted that, with an absorber consisting solely of the inertia ring (1), the connecting links (4) and the inner hub ring (2), the connecting links will be intensely stressed elastically in the event of major incidental amplitudes, but particularly—though not exclusively—by torsional incidental amplitudes. The use of an absorber designed in this manner, for instance on the drive shaft of motor vehicles, is unlikely to achieve a service life expected nowadays. To remedy this, the primary purpose of the buffer webs (5) is to virtually completely fill the free space between two neighbouring connecting links (4). For this reason they are configured in such a manner that their axial surfaces are complementary to the corresponding axial surfaces of the connecting links.

Furthermore, they are dimensional in such a manner that between the opposing axial parting surfaces (6, 7, 14, 18) of the connecting links surfaces (8, 9, 12, 13) of the buffer webs (5), and the coaxial cylindrical opposing parting surfaces (10, 11) of the buffer webs (5), and the surface sections of the hub ring (2) located radially underneath, an axially extending parting gap, consisting of the five partial sections (16, 17, 18, 19, 20), is formed.

In the embodiment of the shaft absorber shown in FIG. 1, there is an accurate equidistant - i.e. surface parallel-relationship between the precisely complementary parting surfaces of the radially external parting gap section (16), namely the parting surfaces (6, 8) of the connecting link (4) of the buffer web (5) and the two opposing parting surfaces (10, 11) of the middle parting gap section (18), between the cylindrical radial inside parting surface of the buffer web (5) and the opposing cylindrical surface section of the hub ring (2), while there is a minor widening of the radially inside parting gap sections (17, 19), between the opposing parting surfaces (7, 9) and (12, 13) of the connecting links 4 of the buffer webs 5, extending from the constriction (21) of the connecting links 4 radially inwardly to the hub ring (2). While the distance of the parting surfaces, i.e. the gap width of the parting gap sections (17, 19) in the vicinity of the largest constriction (21) of the connecting links, has a unit value of 1, the gap width at the hub ring side end of this parting gap sections (17, 19) is, for example, 1,8. The parting gap width of the sections (16, 20) of the parting gap has a constant value of 1, whereas the two cylindrical surfaces, forming the parting surfaces of the parting gap section (18), have a constant surface gap distance of 1.8 from each other.

Precise dimensioning of the parting gap widths, just as the degree of widening of the parting gap sections (17, 19), once again belong within the realms of adjusting the shaft absorber characteristics to the respective application. Both by profiling as well as absolute dimensioning of the spacing and angle of the parting gap, it is possible to freely and optimally adjust, merely after a few proximation tests, not only the maximum response amplitude to incidental amplitudes, but also the entire characteristics of the response behaviour of the absorber to incidental amplitudes. Furthermore, high-grade stabilisation towards incidental oscillations of virtually all modes is obtained for the entire elastomer ring (3) with the connecting links (4) and the buffer webs (5), ultimately also as a result of the axial centering effect of the groove/spring-like engagement of the axial surfaces within the area of the constrictions (21) of the connecting links (4). This resulted in the maintenance of the characteristic frequency of the absorber, even with larger excitation amplitudes and incidental stimulations, particularly in connection with the indicated minor widening of the parting gap widths in the sections (17, 19). In other words, the working range of the shaft absorbers, shown in FIG. 1, can be adjusted almost independently of optimizing the absorption of incidental amplitudes.

We claim:

1. A shaft absorber, comprising three concentrically arranged rings including an outer inertia ring, an inner hub ring, and a segmented elastomer ring extending therebetween and including axially extending connecting links connecting the inertia ring with the hub ring, wherein said connecting links have an outer circumferentially extending outer surface and a circumferentially extending inner surface and a pair of sides respectively connecting said inner and outer surfaces, each said side including (1) a radially inwardly extending first side portion which respectively extends from opposite ends of said outer surface in a converging direction towards each other and (2) a radially inwardly extending second side portion respectively intersecting the first side portions and extending radially inwardly in a diverging direction away from each other to intersect said inner surface, said first and second side portions resulting in substantially each connecting link having an hourglass configuration in axial cross-section, wherein said first and second side portions, in operative positions, are formed without attachment surfaces, substantially each connecting link being fixed to an outer surface area of the inner hub by means of at least one of a compound material joint and a positive joint at said inner circumferentially extending surface, and being fixed to the inertia ring at the outer circumferentially extending surface through one of the segmented elastomer ring and a compound material joint and a positive joint.

2. Shaft absorber as claimed in claim 1, further comprising axially extending buffer webs which form an integral part of the elastomer ring and are disposed between said connecting links and firmly fixed to the inertia ring by means of at least one of a compound material joint and a positive joint, an outer contour of said buffer web being shaped in a spaced and complementary relationship to the first and second side portions of the connecting links and the outer surface area of the hub ring, respectively, thereby defining narrow parting gaps while substantially filling up the space between each pair of adjacent connecting links.

3. Shaft absorber as claimed in claim 2, wherein the buffer webs are larger than the connecting links in the circumferential direction of the shaft absorber.

4. Shaft absorber as claimed in claim 2, wherein the buffer webs are axially longer than the connecting links, said links in turn being axially centered in relation to the buffer webs.

5. Shaft absorber as claimed in claim 2, wherein the parting surfaces, including the first and second side portions, forming the boundaries for the parting gaps between the connecting links, buffer webs and hub ring outer surface, respectively, are arranged in opposed equidistant relation over the entire length of the associated parting gap formed between said parting surfaces.

6. Shaft absorber as claimed in claim 2, wherein the parting surfaces forming the boundaries of the parting gaps mutually are opposed in a strictly equidistant and in a strictly plane-complementary arrangement along sections between the connecting links and the buffer webs which are coextensive with the first side portions, and along a section between the buffer web and the hub ring surface area, whereas the parting surfaces formed coextensive with the second side portions in a radially inner section between the connecting links and the buffer webs, mutually are slightly inclined so that the parting gap widens in a radially inward direction.

7. Shaft absorber as claimed in claim 6, wherein said radially inner section of the parting gap formed between the connecting links and the buffer web widens by a factor of 1.1 to 2.5 with reference to its width when seen generally radially inwardly from the outside towards the hub ring while the section of the parting gap formed between the buffer web and the hub ring surface area has a constant width at least substantially equal to the largest width of the immediately adjacent said radially inner section of the parting gaps formed between the connecting links and the buffer web.

8. Shaft absorber as claimed in claim 1, being a universal-joint propeller shaft absorber in a motor vehicle construction.

9. A shaft absorber, comprising an outer inertia ring, an inner hub ring, and a segmented elastomer ring extending therebetween and including axially extending connecting links connecting the inertia ring to the hub ring, said connecting links having an X-shaped outer contour in axial cross-section and being respectively connected to the outer inertia ring and the inner hub ring along respective outer and inner circumferentially extending surfaces of the connecting link.

* * * * *